United States Patent [19]

Takahashi et al.

[11] 4,120,581

[45] Oct. 17, 1978

[54] APPARATUS FOR AUTOMATICALLY PRINTING COLOR PHOTOGRAPHS

[75] Inventors: Koji Takahashi; Taizo Akimoto; Shigeru Watanabe; Takaaki Terashita, all of Minamiashigara, Japan

[73] Assignee: Fuji Photo Film Co., Ltd., Minamiashigara, Japan

[21] Appl. No.: 808,903

[22] Filed: Jun. 22, 1977

[30] Foreign Application Priority Data

Jun. 22, 1976 [JP] Japan .................................. 51-73577

[51] Int. Cl.² ...................... G03B 27/78; G03B 27/32
[52] U.S. Cl. ........................................ 355/38; 355/77
[58] Field of Search ..................... 355/18, 132, 32, 36, 355/35, 37, 38, 77, 67–71

[56] References Cited

U.S. PATENT DOCUMENTS

| 2,571,697 | 10/1951 | Evans | 355/38 X |
| 3,292,488 | 12/1966 | Griffith | 355/77 X |
| 3,677,641 | 7/1972 | King et al. | 355/68 X |
| 3,708,676 | 1/1973 | Hubol et al. | 355/38 X |
| 3,724,947 | 4/1973 | Paulus | 355/38 |
| 3,790,275 | 2/1974 | Hubol et al. | 355/68 |

Primary Examiner—Donald Griffin
Attorney, Agent, or Firm—Gerald J. Ferguson, Jr.; Joseph J. Baker

[57] ABSTRACT

Red, green and blue densities of a number of points on a color negative or original are measured and the measured values are plotted in a coordinate system. When the measured values of the densities are contained in a predetermined region of the coordinate system defined as the flesh color region, the measured point is determined to be of flesh color. When the number of points determined to be of flesh color is not less than 13 among 748 points sampled, for instance, the color original is determined to have a subject matter of a human figure. Then, in printing the color negative the exposure is controlled to reproduce a flesh color of desired color balance and density.

5 Claims, 10 Drawing Figures

APPARATUS FOR AUTOMATICALLY PRINTING COLOR PHOTOGRAPHS

BACKGROUND OF THE INVENTION

1. Field of the Invention

This invention relates to a method of automatically printing color photographs, and more particularly to a method of automatically making prints from color negatives and positive originals (hereinbelow referred to as "originals") with exposure control. More specifically, the exposure in a color printer is controlled based on the measured color balance and density at points of the original which are of flesh color.

2. Description of the Prior Art

In determining exposure in color printers, various methods have been known and practically employed. A well-known printing system in which the printing light source intensity is adjusted during red, green and blue exposures to levels which will normalize the resulting integrated transmittances to a near-neutral color balance, i.e., "gray", is based on U.S. Pat. No. 2,571,697, Evans. This printing system produces satisfactory results from a large majority of the negatives of a given type of film. It has also been known in the art to adjust the rate of correction for red, green and blue exposures based on a linear combination of the red, green and blue large area transmission densities (LATD) of the original to be printed.

Since the above described conventional printing systems are based on the integrated transmission measurements conducted over the whole area of the original, the obtained prints are not always satisfactory. For instance, if the background of the principal subject matter is primarily red (red curtain or furniture), green (green grass of foliage) or blue (blue sky or water), color correction based only on the aforesaid LATD system is unsatisfactory. This problem is known as "color failure".

Further, if the background of the principal subject matter is of particularly high or low brightness, the conventional correction based on the integrated transmission density does not give satisfactory results. For example, when the principal subject matter has been photographed with a back light or in a spotlight conventional correction will give unsatisfactory results. This is known as "density failure".

According to the inventors' tests, in the color printing process using the LATD printing system the yield of satisfactory prints is about 70% of all the prints obtained.

It has also been known in the prior art to determine the exposure in a color printer based on the measured densities of divided areas of color originals in which the entire area of the original is divided into upper and lower, right and left, and central and peripheral sections. The exposure is determined based on a combination of the LATD and the densities of the divided areas. In this system, the yield of satisfactory prints is somewhat raised. However, since the density of the principal subject matter is not accurately measured in this system, the correction is not always effected in the most desirable manner.

According to the inventors' investigation, about 80% of the color originals have figures as the principal subject matter. Further, in looking at printed color photographs, it is well known that most people are concerned about the faces of the figures. Therefore, in printers, it is desirable that the faces of the figures be printed in a good condition. An exposure controlled to obtain a good flesh color in the areas of flesh color might be improper for areas other than the flesh color areas. However, even so, the yield of satisfactory prints is higher, if the exposure control is based on the flesh color areas.

Thus, it is proposed to print color originals based on the flesh color areas when the originals contain over a certain number of points of flesh color. If the originals have no areas of flesh color, the exposure may be controlled according to the conventional LATD printing system or the like.

SUMMARY OF THE INVENTION

It is therefore the primary object of the present invention to provide a method of automatically printing color photographs in which the exposure is automatically controlled to obtain a desirable reproduction of flesh color.

It is another object of the present invention to provide a method of automatically printing color photographs in which color failure and density failure are effectively prevented.

It is a specific object of the present invention to provide a method of automatically printing color photographs in which the flesh color of the principal subject matter is detected and the exposure is controlled to reproduce the flesh color in a desirable color balance and density.

The above objects are accomplished by detecting flesh color in an original and automatically controlling the exposure to reproduce the flesh color in the desirable color balance and density. In this invention, when the color original is determined to have a principal subject matter of a figure having flesh color, i.e., of a human being, the exposure control is conducted as mentioned above, and when the color original is determined to have a principal subject matter of other than a human figure, the exposure is controlled according to the conventional LATD system or other conventional system the like.

In accordance with the method of the present invention, flesh color is defined as one whose red, green and blue densities fall within an ellipse when plotted in a two-dimensional coordinate system or within an ellipsoid when plotted in a three-dimensional coordinate system the axes of which represent the red, green and blue densities or combinations of the densities of red, green and blue. When the measured color is contained in the ellipse or ellipsoid, the color is assumed to be flesh. The area of the flesh color defined as above can be represented by a formula. The measured red, green and blue densities are put into the formula and it is determined whether or not the color of the measured point is flesh. According to the inventor's tests, when the present invention was applied in a printing system and control of the printing of the negatives containing flesh areas was based on the densities in the flesh areas to reproduce the desirable flesh color, the yield of satisfactory prints was as high as 97%.

DESCRIPTION OF THE PREFERRED EMBODIMENTS

According to the tests conducted by the present inventors, it has been proved possible to define flesh color by an ellipse in a two-dimensional coordination system, or an ellipsoid in a three-dimensional coordination system. The area which defines the flesh color for improving the yield in the color printing system should contain almost all colors which can be referred to as flesh color and should never include a color which cannot be referred to as flesh color. Further, such area should be clearly defined.

The present inventors measured 169 points of flesh color in a number of color negatives by means of a Macbeth densitometer. The size of the scanning spot was 1mm in diameter. The densities of the red, green and blue components of the points measured are shown in Table I below wherein R, G and B show the red, green and blue component densities respectively. The data of samples No. 51 to No. 168 are omitted to save space.

Table I

| No. | B | G | R | dS² |
|---|---|---|---|---|
| 1 | 0.85 | 0.94 | 0.96 | 0.71 |
| 2 | 0.55 | 0.61 | 0.66 | 1.13 |
| 3 | 0.59 | 0.74 | 0.77 | 4.44 |
| 4 | 1.11 | 1.18 | 1.13 | 2.34 |
| 5 | 1.16 | 1.26 | 1.23 | 2.79 |
| 6 | 0.95 | 1.10 | 1.11 | 3.81 |
| 7 | 1.02 | 1.12 | 1.15 | 1.73 |
| 8 | 1.18 | 1.27 | 1.28 | 2.55 |
| 9 | 1.09 | 1.20 | 1.22 | 2.51 |
| 10 | 0.79 | 0.78 | 0.83 | 1.40 |
| 11 | 1.04 | 1.08 | 1.12 | 1.49 |
| 12 | 0.81 | 0.83 | 0.93 | 3.86 |
| 13 | 0.74 | 0.83 | 0.90 | 1.01 |
| 14 | 0.64 | 0.71 | 0.77 | 0.59 |
| 15 | 0.61 | 0.70 | 0.77 | 1.01 |
| 16 | 0.73 | 0.67 | 0.66 | 3.85 |
| 17 | 0.89 | 0.83 | 0.75 | 6.51 |
| 18 | 0.78 | 0.69 | 0.65 | 6.38 |
| 19 | 0.76 | 0.65 | 0.62 | 7.48 |
| 20 | 0.79 | 0.72 | 0.73 | 3.58 |
| 21 | 0.82 | 0.79 | 0.84 | 2.31 |
| 22 | 0.44 | 0.53 | 0.60 | 2.12 |
| 23 | 0.65 | 0.67 | 0.71 | 0.76 |
| 24 | 0.81 | 0.77 | 0.77 | 2.00 |
| 25 | 0.72 | 0.73 | 0.73 | 1.31 |

Table I-continued

| No. | B | G | R | dS² |
|---|---|---|---|---|
| 26 | 0.57 | 0.57 | 0.57 | 3.39 |
| 27 | 0.61 | 0.63 | 0.66 | 1.22 |
| 28 | 0.70 | 0.73 | 0.74 | 0.93 |
| 29 | 1.20 | 1.30 | 1.29 | 2.82 |
| 30 | 0.31 | 0.42 | 0.56 | 4.27 |
| 31 | 1.13 | 1.03 | 1.01 | 5.20 |
| 32 | 0.66 | 0.63 | 0.66 | 2.24 |
| 33 | 0.68 | 0.73 | 0.80 | 0.70 |
| 34 | 0.95 | 0.99 | 1.04 | 1.14 |
| 35 | 0.88 | 0.91 | 0.94 | 0.15 |
| 36 | 0.95 | 0.92 | 0.98 | 3.80 |
| 37 | 1.14 | 1.14 | 1.21 | 6.40 |
| 38 | 0.97 | 0.98 | 1.05 | 3.28 |
| 39 | 0.81 | 0.92 | 0.97 | 1.27 |
| 40 | 1.05 | 1.13 | 1.15 | 1.20 |
| 41 | 0.38 | 0.50 | 0.53 | 5.99 |
| 42 | 0.54 | 0.66 | 0.78 | 3.21 |
| 43 | 0.67 | 0.73 | 0.80 | 0.67 |
| 44 | 0.99 | 1.07 | 1.19 | 8.20 |
| 45 | 1.16 | 1.35 | 1.38 | 8.58 |
| 46 | 1.60 | 1.60 | 1.44 | 9.32 |
| 47 | 1.32 | 1.37 | 1.33 | 2.49 |
| 48 | 1.52 | 1.53 | 1.37 | 9.48 |
| 49 | 1.42 | 1.46 | 1.36 | 4.89 |
| 50 | 1.45 | 1.43 | 1.33 | 4.42 |
| ... | ... | ... | ... | ... |
| 169 | 0.42 | 0.49 | 0.54 | 2.70 |

Figure 1:
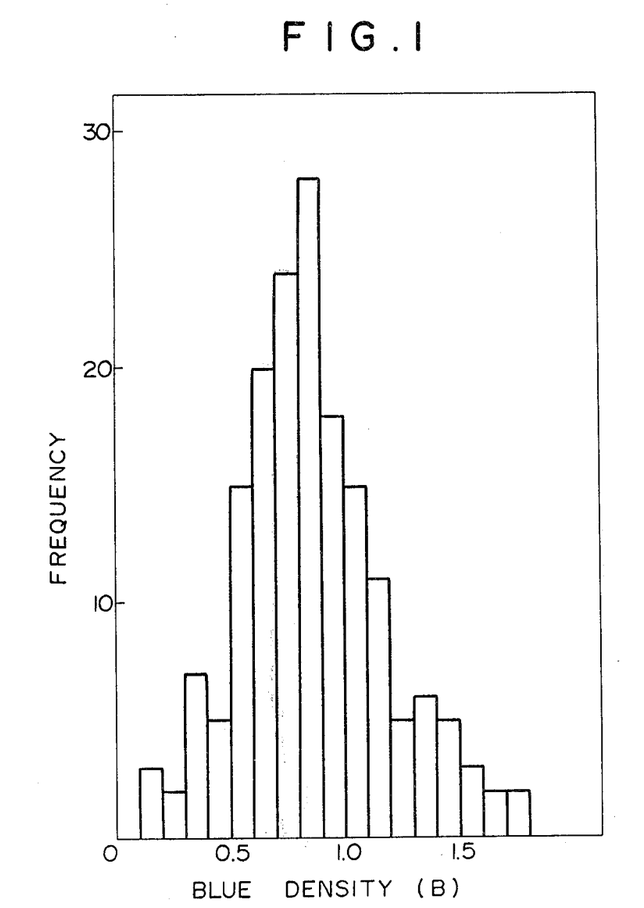
FIG. 1 is a histogram showing the distribution of blue components of different densities in flesh color portions of color originals.

In the above Table I, dS² is a value which is used to define flesh color as described in detail hereinafter. The relation between the density of the blue density B and the frequency (rate of occurence) of the density in Table I is shown in the histogram of FIG. 1. From the histogram, it can be seen that the blue densities B have substantially a Gaussian distribution. The average blue density was 0.862. Similar histograms were obtained for the green and red densities, and the average densities were 0.903 and 0.923, respectively.

From the above results, it may be concluded that the red, green and blue densities R, G and B have three dimensional Gaussian distributions about a central point of $(\overline{R},\overline{G},\overline{B})$ which represents the three average values of the red, green and blue densities. Since the three Gaussian distributions are not identical with each other, the red, green and blue densities of flesh color exist within an ellipsoid having its center at the coordinate of the average values of the three densities.

The ellipsoid or ellipse is represented by the following general formula $$dS^2 = \sum_{ij=1}^{n} a_{ij} x_i x_j \qquad (1)$$

where $a_{ij}$ is a constant and $$x_1 = B - \overline{B}, \ x_2 = G - \overline{G}, \ \text{and} \ x_3 = R - \overline{R}.$$

In the above formula, when n is 2 the formula represents an ellipse, and when n is 3 the formula representes an ellipsoid.

Therefore, in case of an ellipsoid, the formula can be converted as follows.

$$dS^2 = C_{11}dB^2 + 2C_{12}dB \cdot dG + C_{22}dG^2 + 2C_{23}dG \cdot dR + C_{33}dR^2 + 2C_{31}dR \cdot dB. \qquad (2)$$

Since $dB=x_1$, $dG=x_2$ and $dR=x_3$, $$dB = B - \overline{B}, \ dG = G - \overline{G} \ \text{and} \ dR = R - \overline{R}.$$

In the formula (2), $C_{ij}$ is an element of an inverse matrix of the following variance-covariance matrix.

$$A = \begin{bmatrix} \text{Var}(B) & \text{Cov}(B,G) & \text{Cov}(R,B) \\ \text{Cov}(B,G) & \text{Var}(G) & \text{Cov}(G,R) \\ \text{Cov}(R,B) & \text{Cov}(G,R) & \text{Var}(R) \end{bmatrix}$$

where $$\text{Var}(B) = \frac{1}{N-1} \sum_{i=1}^{N} (Bi - \bar{B})^2$$

$$\text{Var}(G) = \frac{1}{N-1} \sum_{i=1}^{N} (Gi - \bar{G})^2$$

$$\text{Var}(R) = \frac{1}{N-1} \sum_{i=1}^{N} (Ri - \bar{R})^2$$

$$\text{Cov}(B,G) = \frac{1}{N-1} \sum_{i=1}^{N} (Bi - \bar{B})(Gi - \bar{G})$$

$$\text{Cov}(G,R) = \frac{1}{N-1} \sum_{i=1}^{N} (Gi - \bar{G})(Ri - \bar{R})$$

$$\text{Cov}(R,B) = \frac{1}{N-1} \sum_{i=1}^{N} (Ri - \bar{R})(Bi - \bar{B})$$

wherein N is the number of sample points, i.e., 169 in this case, and $Bi$, $Gi$ and $Ri$ are densities of the respective colors at the flesh color points.

Figure 2:
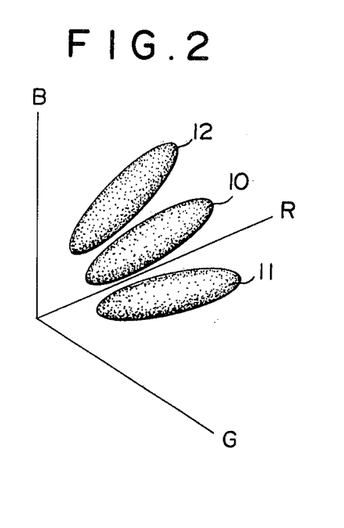
FIG. 2 is a three-dimensional coordinate showing ellipsoids which define flesh color regions under different conditions of illumination.

In formula (1), the size of the ellipsoid changes according to the value of $dS^2$. If the ellipsoid is large, the flesh color area will contain all color points but will cover non-flesh colors too. In this case, flesh color will always be detected as such, but on the other hand non-flesh color will also be detected as flesh color. If the ellipsoid is too small, the discrimination will become too fine and there will occur some cases in which flesh color is detected as non-flesh color. When the value $dS^2$ was selected so that 95% of the input data relating to the 169 points would be contained in the ellipsoid 10 as shown in FIG. 2, the value of $dS^2$ became 7.81. In this case, $\bar{B} = 0.862$, $\bar{G} = 0.903$ and $\bar{R} = 0.923$, and $$C_{ij} = \begin{pmatrix} 310.1 & -486.4 & 197.7 \\ -486.4 & 1150.4 & -745.5 \\ 197.7 & -745.5 & 629.5 \end{pmatrix}$$

The above results were obtained with reference to color negatives photographed under daylight condition. When the color negatives were photographed under different illumination conditions such as tungsten light or fluorescent light, the distributions of the three color densities shifted from those of the negative photographed under daylight condition. For instance, the area of the flesh color shifted from 10 to 11 in the case of negatives photographed under fluorescent light as shown in FIG. 2. In case of negatives photographed under tungsten light, the flesh color area 10 shifted to area 12. Since the distribution of the densities in the flesh color area differs relative to the illumination source, the kind of illumination source can be known by checking in what ellipsoidal region the measured densities are contained. The proper color correction can be made according to the kind of illumination.

Further, in the case of black people, it has been surprisingly found according to the inventor's tests that there is no shift in the flesh color region as in the case of the source of illumination. In this case, the luminosity of the flesh color is lowered, but there is no change in the color balance. The flesh color region in case of the yellow people, such as Japanese, was found to be substantially the same as that of white people.

In the present invention, the terms "ellipse" and "ellipsoid" should be broadly interpreted to include the circle and the sphere. When the red, green and blue densities are used for the three axes of the three-dimensional rectangular coordinates, the flesh color can be defined by an ellipsoid as mentioned above. However, if combinations of the three color densities are used for the three axes, the flesh color is defined by a solid which is not an ellipsoid but has an elliptical cross section. Therefore, broadly, the flesh color can be defined by a solid which has an elliptical cross section in a three-dimensional coordinate system having three axes representing the red, green and blue densities respectively or three axes each representing the combination of these densities. In a two-dimensional coordinate system, the flesh color can be defined by an ellipse. The two axes of the two-dimensional coordinate system may represent two kinds of color density ratios or differences based on the primary three color densities, as will be described in detail hereinafter.

Now a preferred embodiment of the present invention will be described in detail. Flesh color is detected in a color negative film having an image frame size of 24 mm × 36 mm. A flying spot scanner having a flying spot of 1 mm diameter is used to scan the film at intervals of 1 mm. Therefore, 748 points (24×36) are sampled. In order to check if the color of a sampled point is a flesh color, the red, green and blue densities R, G and B at the point are put into the foregoing formula (2) to see if the value of the formula ($dS^2$) is within the range of the above defined flesh color, i.e., 7.81. That is, the formula (2) can be rewritten as follows.

$$dS^2 = 310.1(B-0.862)^2 - \\ 972.8(B-0.862)(G-0.903) + 1150.4(G-0.903)^2 \\ - 1490.0(G-0.903)(R-0.923) + \\ 629.5(R-0.923)^2 + 395.4(R-0.923)(B-0.862) \quad (3)$$

When the measured densities R, G and B are put into this formula and the value of $ds^2$ becomes
$dS^2 \leq 7.81$, the color of the point is a flesh color, and if, $dS^2 > 7.81$, the color is not a flesh color.

In practical measurement, the output of the flying spot scanner may be recorded on a magnetic tape and the recorded tape can be checked through an electronic computer. The recorded output given by the flying spot scanner should be converted to the Macbeth density in this case.

In the practical application of the present invention to a color printing system, the number of points which are detected as being flesh color should be counted to determine if the principal subject matter is a human figure. If the counted number is too small, the principal subject matter is not a human figure but may be a scene or something else. According to the inventor's tests, the principal subject matter can be determined to be a figure having flesh color when the number of flesh color prints is not less than 13 among 748 sampled points, which corresponds to about 1.74 to 1.8%. When it is determined that the principal subject matter is a human figure, the average densities $\bar{R}$, $\bar{G}$ and $\bar{B}$ of the color original are calculated and used for reproducing the principal subject matter in a desirable flesh color. The average densities may be obtained by simply calculating the average densities from the data on all the points of flesh color, or by calculating the average densities from the data on only a selected part of the original, i.e., the data on the points of flesh color which are in a preselected part of the original, e.g. a central section of the original. Further, the average densities may be obtained by calculating the average densities from the data on all the points of flesh color which are selectively given weight relative to their positions in the original.

The exposure is controlled in the color printer to print the average densities $\bar{R}$, $\bar{G}$ and $\bar{B}$ into preferable densities R', G' and B'. By controlling the exposure in this manner, the flesh color is reproduced into a preferable flesh color of preferable color balance and density.

In color printing, there are known a subtractive printing process and an additive printing process both of which can be employed in the present invention. The description hereinbelow will be made with respect to the subtractive color process. In the subtractive color process, three cut filters of cyan C, magenta M and yellow Y are inserted into the printing optical path to control the exposure. Therefore, the insertion time of the three cut filters C, M and Y is controlled to obtain a print of desirable quality.

Considering the spectroscopic sensitivity, $x_i D_\lambda$, at the density D of the color photographic paper, the spectroscopic energy distribution, $S_\lambda$, of the light source of the color printer, the spectroscopic transmission distribution, $T_\lambda$, of the color negative film, the exposure value required to obtain a desired density D on the print is given by:

$$\log E_i^D = -\log \frac{\int S_\lambda \cdot T_\lambda \cdot x_i D_\lambda d\lambda}{\int S_\lambda d\lambda} \tag{3}$$

wherein $i = R$, G, B and $\lambda$ is the wavelength.

Figure 3:
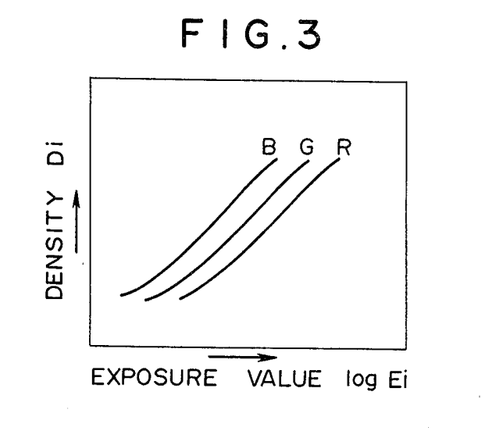
FIG. 3 is a graph showing the characteristic curves of a color photographic paper.

By changing the density D from zero to $D_{max}$, three characteristic curves can be obtained by calculation. The three characteristic curves thus obtained are shown in FIG. 3.

Therefore, when the spectroscopic energy distribution $S_\lambda$ of the light source of the color printer and the spectroscopic transmission distribution $T_\lambda$ (which is determined from three color densities, R, G and B, of the color negative) are known, and the exposure value is given, the resulting densities R', G' and B' can be estimated. Therefore, the preferred densities R', G' and B' can be obtained on the color photographic paper by controlling the spectroscopic energy distribution $S_\lambda$ of the light source.

Figure 4:
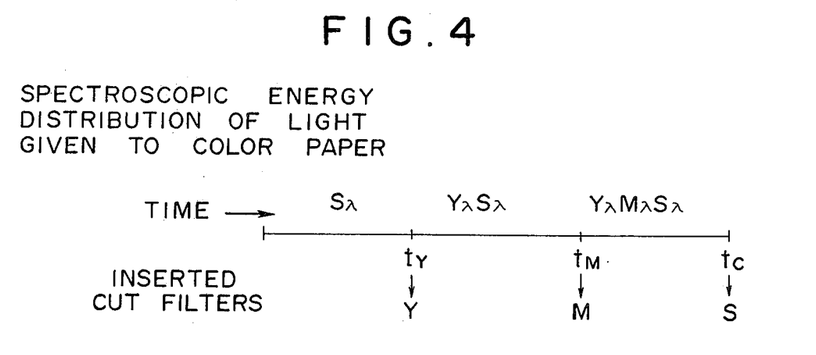
FIG. 4 is a time scale showing the timing of the insertion of cut filters used for controlling exposure.

Considering the spectroscopic distribution of the cyan C, magenta M and yellow Y cut filters, $C_\lambda$, $M_\lambda$, $Y_\lambda$, and the insertion time of the cut filters, $t_O$, $t_M$, $t_Y$, and assuming that the cut filters are inserted into the optical path of the printer as shown in FIG. 4, the spectroscopic energy distribution of the light given to the color photographic paper, $S'_\lambda$, is given by $$S'_\lambda = t_Y S_\lambda + (t_M - t_Y) Y_\lambda S_\lambda + (t_C - t_M) Y_\lambda M_\lambda S_\lambda \tag{4}$$

$$S'_\lambda = t_Y S_\lambda \{1 + (\frac{t_M - t_Y}{t_Y}) Y + (\frac{t_C - t_M}{t_Y}) Y_\lambda M_\lambda\} \tag{5}$$

Then, replacing $(t_M - t_Y / t_Y)$ by $a$, and $(t_C - t_M / t_Y)$ by $b$, $$S'_\lambda = t_Y S_\lambda (1 + aY_\lambda + bY_\lambda M_\lambda) \tag{6}$$

Therefore, the estimated characteristic curves in this case are given by $$\log E_i^D = -\log \frac{\int S'_\lambda \cdot T_\lambda \cdot x_i D_\lambda d\lambda}{\int S'_\lambda d\lambda} \tag{7}$$

Figure 5:
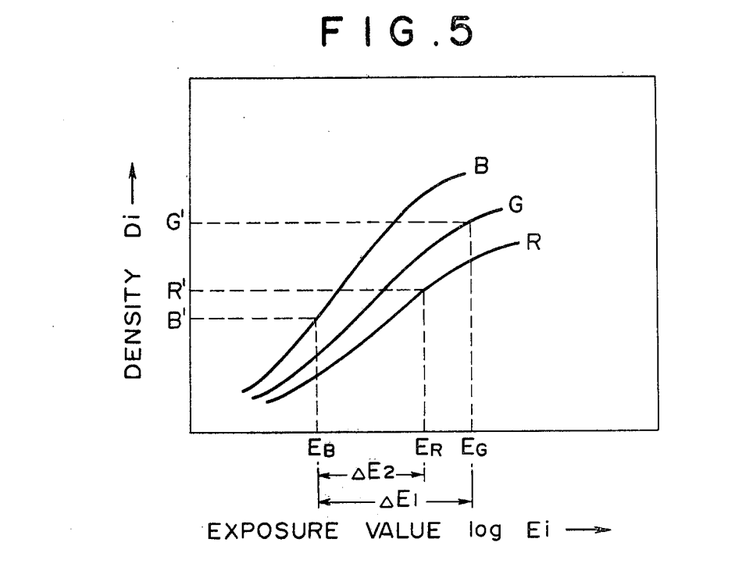
FIG. 5 is a graph showing the characteristic curves of the color photographic paper at the initial stage where $a=0$ and $b=0$ in the formula given in the disclosure.

Now, putting $a = 0$ and $b = 0$ in the above formula (6), the characteristic curves as shown in FIG. 5 are obtained. In order to print in the preferred densities R', G' and B', the exposure values required for red, green and blue printing are $E_R$, $E_G$ and $E_B$ as shown in FIG. 5.

In this case, since $E_R \neq E_G \neq E_B$, it is impossible to obtain the preferred densities of R', G' and B' at the same time. However, by properly selecting the values $a$ and $b$ in the formula (6), the characteristic curves are changed to those as shown in FIG. 6 in which the preferred densities R', G' and B' can be obtained at the same time by providing an exposure value of E'.

The proper values for $a$ and $b$ can be selected by nonlinear optimization. By this optimization technique, the order and the time of insertion of the three cut filters C, M and Y can be properly determined.

Figure 6:
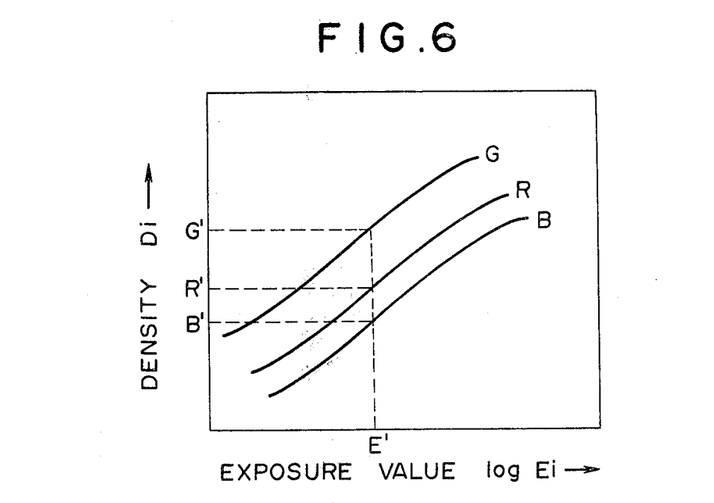
FIG. 6 is a graph showing the characteristic curves of the color photographic paper at a stage which is utilized in the present invention where the desirable densities of three colors can be obtained at once.

In order to obtain the desirable values for $a$ and $b$ in the formula (6) to change the characteristic curves as shown in FIG. 5 to those as shown in FIG. 6 where $E' = E_R = E_G = E_B$, the amounts $\Delta a$ and $\Delta b$ by which the initial values of the variables $a$ and $b$ should be changed are obtained by use of the following formula (8). In formula (8) the preferred color densities R', G' and B' are designated by D'R, D'G and D'B.

$$\begin{pmatrix} \Delta a \\ \Delta b \end{pmatrix} = \begin{pmatrix} \frac{\delta \log E_G^{D'G}}{\delta a} & \frac{\delta \log E_G^{D'G}}{\delta a} \\ \frac{\delta \log E_R^{D'R}}{\delta a} & \frac{\delta \log E_R^{D'R}}{\delta a} \end{pmatrix} \begin{pmatrix} \Delta E_1 \\ \Delta E_2 \end{pmatrix} \tag{8}$$

where $\Delta E_1$ and $\Delta E_2$ are differences in exposure values as follows, $$\Delta E_1 = E_G - E_B, \quad \Delta E_2 = E_R - E_B.$$

Further, $$\frac{\delta \log E_G^{D'G}}{\delta a} = \frac{\delta}{\delta a} (-\log \frac{\int S'_\lambda \cdot T_\lambda \cdot x_G^{D'G} d\lambda}{\int S'_\lambda d\lambda}) = \tag{9}$$

$$-\frac{\delta}{\delta a} \{\log \frac{\int S_\lambda (1 + aY_\lambda + bY_\lambda M_\lambda) T_\lambda \cdot x_G^{D'G} d\lambda}{\int S_\lambda (1 + aY_\lambda + bY_\lambda M_\lambda) d\lambda}\} =$$

$$-\frac{1}{\log_e 10} \{\frac{\int S_\lambda (1 + aY_\lambda + bY_\lambda M_\lambda) d\lambda}{\int S_\lambda (1 + aY_\lambda + bY_\lambda M_\lambda) T_\lambda \cdot x_G^{D'G} d\lambda} -$$

$$\frac{\int S_\lambda \cdot Y_\lambda d\lambda}{\int S_\lambda (1 + aY_\lambda + bY_\lambda M_\lambda) d\lambda}\}$$

Similarly, the following values can be obtained.

$$\frac{\delta \log E_R^{D'R}}{\delta a} \quad \frac{\delta \log E_G^{D'G}}{\delta b} \quad \frac{\delta \log E_R^{D'R}}{\delta b}$$

By the obtained $\Delta a$ and $\Delta b$, the initial values of $a$ and $b$ are changed to new values $a_1$ and $b_1$. When the values which have been successively changed n-times, namely when they become the n-th values, they are designated by $a_n$ and $b_n$. The first changed new values $a_1$ and $b_1$ are given by $$a_1 = a_0 + \Delta a = \Delta a$$

$$b_1 = b_0 + \Delta b = \Delta b.$$

By repeating the change of the values $a$ and $b$, the exposure values $E_R$, $E_G$, $E_B$ are finally made equal to each other. Assuming that $a=1.2$ and $b=1.8$ are obtained by the above optimization, $$a = \frac{t_M - t_Y}{t_Y} = 1.2$$

$$b = \frac{t_C - t_M}{t_Y} = 1.8$$

$$\therefore t_M = 2.2 t_Y$$

$$t_C = 4.0 t_Y$$

$$\therefore t_Y : t_M : t_C = 1 : 2.2 : 4.0$$

Thus, the ratio of the exposure times, i.e., the insertion durations between the cyan, magenta and yellow cut filters is obtained. The absolute value of the exposure time is determined with reference to a particular case in which the calculation and the results of tests are made to correspond with each other.

Thus, the proper exposure can be obtained by a calculation performed in the above described manner on the bases of the selected spectroscopic energy distribution of the light source $S_\lambda$ of the color printer, the spectroscopic transmission $T_\lambda$ of the cyan, magenta and yellow cut filters and the spectroscopic sensitivity of the color photographic paper $x_i D_\lambda$. The time required for the calculation was about 5 seconds when a computer was used. Five seconds is too long and impractical when the method is used in an automatic color printer. Therefore, it is desired to determine the proper exposure time, i.e. the insertion time of the cut filters, in a much shorter time.

Figure 7:
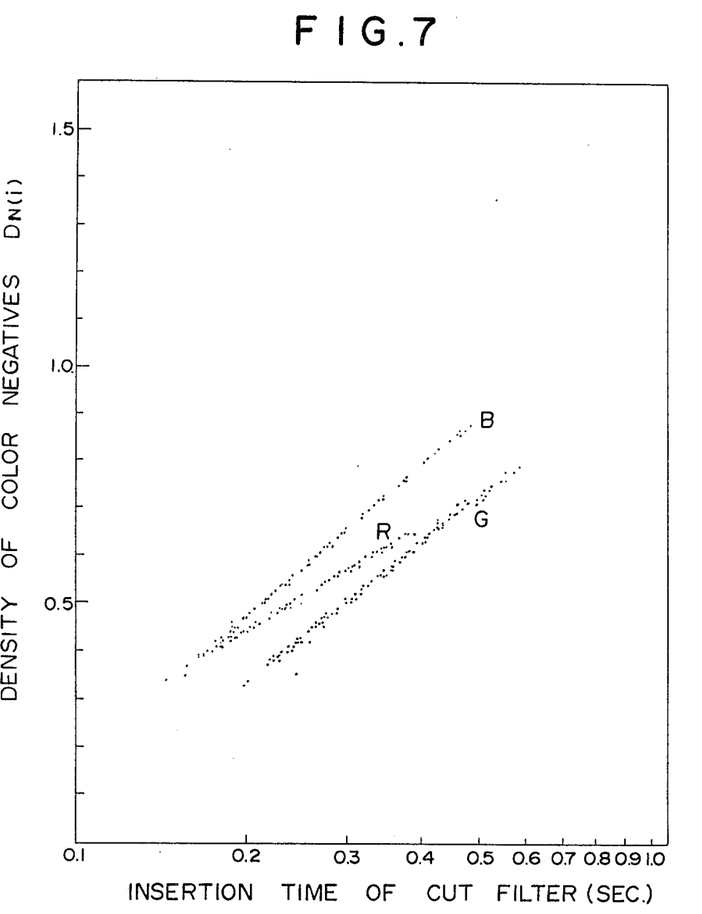
FIG. 7 is a graphical representation showing the relationship betweeen the insertion time of cut filters and the average color densities of the color negatives.
Figure 8:
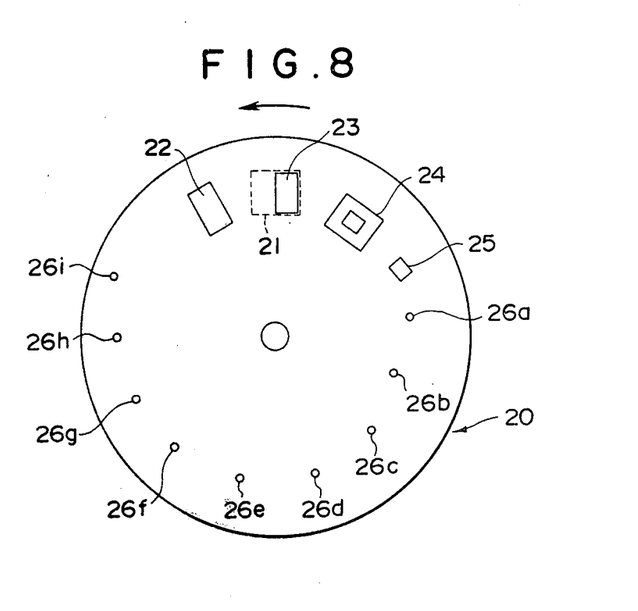
FIG. 8 is a plan view of a rotatable disc used for scanning color originals.

In order to meet this requirement, a general formula for determining the exposure time based on the measured densities of the originals has been established by the present inventors. When the densities of three colors $D_N(R)$, $D_N(G)$ and $D_N(B)$ of the flesh color points in negatives are plotted in relation with the insertion time of the cut filters C, M and Y calculated in the aforesaid manner, a graphical representation as shown in FIG. 7 is obtained. FIG. 8 shows that the logarithm of the exposure time, insertion time, and the densities of the color components in the flesh color are in a linear relationship which can be given by the following formula.

$$\log T_i = \sum_{i=1}^{3} \alpha_{ij} D_N(j) + \beta_i, (i = 1, 2 \text{ or } 3) \quad (10)$$

By use of this formula (10), the desirable exposure time can easily be obtained.

The detection of the flesh color points is conducted by use of a flying spot scanner as mentioned hereinbefore. Instead of the flying spot scanner, a line scanning raster device or a rotatable disc with scanning perforations can be employed.

Figure 9:
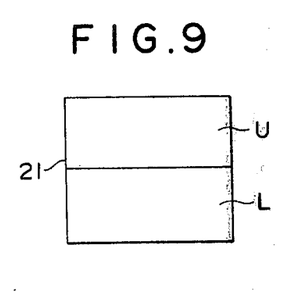
FIG. 9 is an explanatory view showing a color negative the whole area of which is divided into an upper section and a lower section.
Figure 10:
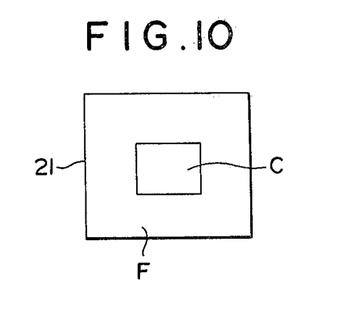
FIG. 10 is an explanatory view showing a color negative the whole area of which is divided into a central section and a peripheral section.

FIG. 8 shows an example of a rotatable disc with the perforations employed in an embodiment of the present invention. A rotatable disc 20 has a first aperture 22 for measuring the mean density of the upper half section, a second aperture 23 for measuring the mean density of the lower half section, a third aperture 24 for measuring the mean density of the peripheral section and a fourth aperture 25 for measuring the mean density of the central section of a color negative 21. Further, the rotatable disc 20 has a number of small perforations 26a to 26i for measuring the density of a number of points on the negative 21 by scanning the negative 21 in the vertical direction. The first and second apertures 22 and 23 divide the whole area of the color negative 21 into upper and lower half sections U and L as shown in FIG. 9. The mean density of the upper half section U of the color negative 21 will be referred to as $D_U$, and the mean density of the lower half section L of the color negative 21 will be referred to as $D_L$. The third and fourth apertures 24 and 25 divide the whole area of the color negative 21 into a peripheral section F and a central section C, the mean densities of which will respectively be referred to as $D_F$ and $D_C$. The rotatable disc 20 has a number of angularly spaced small perforations 26a to 26i each at different distance from the center of rotation thereof. The first perforation 26a is located to scan the leftmost part of the negative 21 and the last perforation 26i is located to scan the rightmost part of the negative 21. The rotatable disc 20 is provided with a position detector for synchronizing the position of the disc with the measuring timing. The position detector may be replaced with notches formed on the periphery of the disc 20 combined with a photocoupler located at a position to see the periphery.

As the rotatable disc 20 rotates in the direction of the arrow as shown in FIG. 8, the first aperture 22 is first over the upper section U of the color negative 21 (in FIG. 8 on the left side half of the negative 21). At this stage, the mean transmission density $D_U$ of the upper half section of the negative 21 is measured by means of said position detector and a photodetector (not shown). Then, when the second aperture 23 is over the lower section L of the color negative 21, the mean transmission density $D_L$ of the lower half section of the negative 21 is measured. Similarly, the mean transmission densities of the peripheral portion $D_F$ and the central portion $D_C$ are measured.

When the first small perforation 26a scans the leftmost part of the negative 21, the density of the negative is measured at several positions by means of a sampling method in which the density is measured several times at equal intervals. Thus, the density is measured at several points along the leftmost part of the negative 21 on the scanning line scanned by the first perforation 26a. In this case, the density is measured with respect to three primary colors R, G and B. Simultaneously, the light passing through the negative 21 is used to measure the maximum density $D_{max}$ and the minimum density $D_{min}$, also. Similarly, the second to last small perforations 26b to 26i are used to measure the densities of a number of points on the negative 21 over the whole area thereof. When the measured and plotted densities of the three colors are contained in the aforementioned regions of flesh color defined by the solid having an elliptical cross section or by the ellipse, the color of the point measured is determined to be of flesh color. When the number of points determined as being of flesh color is not less than 13 among 748, the color negative is determined to have a principal subject matter of a figure having a flesh color, and the exposure is controlled as described hereinabove.

That is, when the color negative or original has been determined to have a subject matter of flesh color, the mean densities of the three colors $\bar{R}$, $\bar{G}$ and $\bar{B}$ are calculated from the densities of all the points determined to be of flesh color. By these mean densities $\bar{R}$, $\bar{G}$ and $\bar{B}$, the insertion times of the cyan, magenta and yellow cut filters $t_C$, $t_M$ and $t_Y$ are obtained by use of the formula (10). By printing the negative in this manner, the three color densities obtained on the color photographic paper become the preferred densities $R'$, $G'$ and $B'$ required to obtain a desirable flesh color on the paper.

When the color negative is determined not to have a subject matter of flesh color, the exposure control of the printing thereof is conducted by means of LATD system in which the following correction $\Delta D$ is made.

$$\Delta D = K_1 + K_2(D_{min} + \text{Cont}/2 - D_{LATD}) + K_3(D_C - D_F) + K_4(D_L - D_L) \qquad (11)$$

wherein $\text{Cont} = D_{max} - D_{min}$ and $K_1$ to $K_4$ are numerical constants. Instead of the formula (11), the following formula may be employed.

$$\Delta D = K_1 + K_2(D_{min} + \text{Cont}/2 - D_{LATD}) \qquad (12)$$

Since the color negatives which do not have a subject matter of flesh color generally need minus correction (to shorten the exposure time) or need no correction (about 83% of the negatives of this kind are found not to need positive correction), the formula of correction (11) or (12) using the $D_{max}$ and $D_{min}$ which is effective for minus correction is properly utilized in this exposure control. Of course, in this case, it is possible to use the LATD system only.

We claim:

1. Apparatus for automatically printing color photographs on color photographic papers from color originals comprising means for measuring the red, green and blue densities of a number of points in the original, means for determining if the points are of flesh color including (a) means for comparing the measured red, green and blue densities with a predetermined region corresponding to a reference flesh color and defined in a two or three dimensional coordinate system having the red, green and blue densities as the axes thereof, and (b) means for determining that the points are of flesh color when the measured densities are contained in said region, means for counting the number of the points which are determined as of flesh color, and means for controlling the exposure to print the original on the color photographic paper in such a color balance and density that the flesh color is reproduced in a desired color balance and density when the number of the points determined to be flesh color is more than a predetermined number.

2. Apparatus for of automatically printing color photographs as defined in claim 1 wherein said predetermined region is a solid having an elliptical cross section or an ellipse.

3. Apparatus for automatically printing color photographs as defined in claim 1 wherein said means for controlling the exposure includes means for controlling the exposure to print the mean densities of red, green and blue components of the points determined to be flesh color as preferred densities.

4. Apparatus for of automatically printing color photographs as defined in claim 1 wherein said predetermined number is 12 when the total number of measured points on the original is 748.

5. Apparatus for automatically printing color photographs as defined in claim 1 wherein said step of controlling the exposure comprises inserting cut filters into an optical path of a printer for a time $t_i$ defined by the following formula:

$$\log t_i = \alpha_i D_i + \beta_i$$

wherein $\alpha$ and $\beta$ are numerical constants, D is the measured color density and $i$ represents red, green or blue.

* * * * *